US008103434B2

(12) United States Patent  (10) Patent No.: US 8,103,434 B2
Helbing et al.  (45) Date of Patent: Jan. 24, 2012

(54) METHOD FOR COORDINATION OF COMPETING PROCESSES OR FOR CONTROL OF THE TRANSPORT OF MOBILE UNITS WITHIN A NETWORK

(75) Inventors: Dirk Helbing, Zürich (CH); Stefan Lämmer, Dresden (DE)

(73) Assignee: ETH Zuerich, Zurich (CH)

( * ) Notice: Subject to any disclaimer, the term of this patent is extended or adjusted under 35 U.S.C. 154(b) by 941 days.

(21) Appl. No.: 11/914,759

(22) PCT Filed: May 10, 2006

(86) PCT No.: PCT/DE2006/000837
§ 371 (c)(1),
(2), (4) Date: Apr. 22, 2008

(87) PCT Pub. No.: WO2006/122528
PCT Pub. Date: Nov. 23, 2006

(65) Prior Publication Data
US 2008/0235398 A1   Sep. 25, 2008

(30) Foreign Application Priority Data
May 17, 2005  (DE) .................. 10 2005 023 742

(51) Int. Cl.
*G08G 1/00*  (2006.01)
(52) U.S. Cl. ........ 701/117; 701/118; 701/211; 701/202; 701/209; 701/210; 340/910; 340/911; 340/917; 455/575.9
(58) Field of Classification Search .................. 701/117, 701/118, 211, 209, 202, 210, 182, 212; 340/910, 340/911, 917; 455/575.9
See application file for complete search history.

(56) References Cited

U.S. PATENT DOCUMENTS
3,660,812 A   5/1972  Inose et al.
(Continued)

FOREIGN PATENT DOCUMENTS
DE   699 13 944 T2   12/2000
WO   99/41726   8/1999

OTHER PUBLICATIONS

Porche et al.: "A Decentralized Scheme for Real-Time Optimization of Traffic Signals", Proceedings of the 1996 IEEE International Conference on Control Applications, Dearborn, MI, pp. 582-589, Sep. 15-18, 1996.

(Continued)

*Primary Examiner* — James Trammell
*Assistant Examiner* — McDieunel Marc
(74) *Attorney, Agent, or Firm* — Laurence A. Greenberg; Werner H. Stemer; Ralph E. Locher

(57) ABSTRACT

A method for coordination of concurrent processes or for control of the transport of mobile units within a network, wherein a) the control of the network occurs in a decentralized and self-organizing manner in the controllers of node points or local defined sub-networks, whereby the control units of adjacent node points or sub-networks are connected to each other for data exchange of, b1) data from prediction models for local process sequences at each node and/or data from prediction models for the local process sequences of adjacent nodes and/or b2) data from data recording elements of each node or the boundaries associated therewith and/or data from data recording elements of adjacent nodes or the boundaries associated therewith, c) local simulation and optimization of switching the controller to establish the performance of the nodes or sub-networks with regard to the buffer capacity of the boundaries based on models for short-term predictions with fixed switch states for adjacent nodes, are applied.

24 Claims, 2 Drawing Sheets

U.S. PATENT DOCUMENTS

| | | | | |
|---|---|---|---|---|
| 5,092,705 | A * | 3/1992 | Raswant | 404/1 |
| 5,821,878 | A * | 10/1998 | Raswant | 340/907 |
| 5,898,681 | A * | 4/1999 | Dutta | 370/229 |
| 5,959,553 | A * | 9/1999 | Raswant | 340/907 |
| 6,253,064 | B1 * | 6/2001 | Monroe | 455/66.1 |
| 6,339,383 | B1 | 1/2002 | Kobayashi et al. | |
| 6,424,271 | B2 * | 7/2002 | Raswant | 340/907 |
| 6,496,773 | B1 | 12/2002 | Olsson | |
| 6,650,948 | B1 * | 11/2003 | Atkinson et al. | 700/66 |
| 6,774,816 | B1 * | 8/2004 | Raswant | 340/907 |
| 6,975,940 | B1 * | 12/2005 | Childs et al. | 701/209 |
| 2003/0171939 | A1 * | 9/2003 | Yagesh et al. | 705/1 |
| 2006/0248565 | A1 * | 11/2006 | Shimp et al. | 725/123 |

OTHER PUBLICATIONS

Friedrich et al.: "A New Approach for Integrated Traffic Control in Metropolitan Areas", 7$^{th}$ World Congress on Intelligent Transport Systems, pp. 1-7, Nov. 6-9, 2000.

* cited by examiner

METHOD FOR COORDINATION OF COMPETING PROCESSES OR FOR CONTROL OF THE TRANSPORT OF MOBILE UNITS WITHIN A NETWORK

BACKGROUND OF THE INVENTION

Field of the Invention

The invention relates to a method for control of the transport of mobile units within a network, in particular for controlling a traffic network or for controlling a complex production process. The invention is also applicable to the control of logistics processes and, in the wider sense, also to the control of information transmission processes or the coordination of mutually interacting organizational and program procedures.

Methods such as these are used, for example, in order to allow an optimized traffic flow of vehicles and pedestrians within traffic networks. Adaptive control methods are also used to control production processes, or in chemical process and method technology. However, in general, it should be noted that the relationship between the dynamics of complex systems with non-linear behavior and the network structure have so far been understood only incompletely, and that corresponding optimization methods are therefore of a heuristic nature, or are best-practice approaches. In the case of large systems, this is also justified by the extraordinary computation complexity, which "explodes" as the number of network nodes increases. The methods used therefore have numerous shortcomings. By way of example, one conventional approach is the event-oriented simulation technique. However, this has a tendency to result in "faultless action", while minimizing the average waiting times in the system paradoxically often necessitates time delays in order to better coordinate concurrent processes. The list of the methods used and of their respectively different deficits may be extended indefinitely. Although a large number of methods provide solution approaches for problem elements, there has so far been a lack of a general approach to systematic coordination of concurrent (dispatch) processes in large networks with irregular time variation of demand and capacity variables.

Many different versions of methods for traffic control in traffic networks are known from the prior art. Related problems also occur in the routing of data streams in networks, for example the Internet. However, the differences that exist are considerable: while the majority of the mobile units in traffic networks are covered by the edges (roads), where the greatest time delays occur and are not lost, data is predominantly temporarily stored in the network nodes (servers) where time is lost, or they are lost, when the storage capacity is reached. Furthermore, switching times are negligible and usage conflicts are of a different nature, in data networks. The methods for adaptive data routing are therefore unsuitable for light-signal control.

The best known and most widely used strategies for traffic control in traffic networks deal with the synchronization of the traffic along traffic routes with the aim of producing green waves, whose characteristic is that the traffic flows along the traffic route, and that fuel consumption can in consequence be reduced, and journey times can be shortened. Examples of the various implementation options will be referred to briefly in the following text.

According to DE 44 36 339 A1, a method is known for traffic-adaptive control of a traffic light installation, with sensors for traffic acquisition in the crossing area supplying data cyclically, which is converted to specific control sequences for the traffic lights. Apart from the principles required for road safety, the method does not require any prefabricated model. The green phases are matched to the traffic flow as a function of time fluctuations in the amount of traffic.

DE 198 41 457 A1 discloses a method for determining a traffic-dependent signal program for signal groups of light-signal installations, in which the signal sequences of signal groups are determined by signal programs. The signal programs are matched to the instantaneous traffic situation by taking account of the current data as determined by traffic detectors. In this case, signal programs of a different order are produced, are weighted with a quality function, and further signal programs are produced from their combination. The signal program that is determined to be the optimum is, finally, used to control the light-signal installation.

DE 196 47 127 A1 discloses a method for automatic traffic monitoring with dynamic jam analysis, in which, according to the invention, the time-dependent positions of the upstream end of the jam and the downstream end of the jam are estimated continuously using characteristic relationships taking account of the flow and the density of the traffic and of the jam, the time at which the upstream end of the jam passes a respective first measurement point, the time at which the downstream end of the jam passes this measurement point, as well as the flow and the mean vehicle speed at this first measurement point as well as at a second measurement point which is located upstream of the upstream jam end.

EP 1 057 155 B1 discloses a method for traffic management in a road network, in which the risk of blocking a downstream link is also assessed in an allocation determination process, and is processed in a central computer.

The methods according to the prior art tend to have the disadvantage that the control concepts either do not ensure good coordination between adjacent traffic lights or originate from centrally controlled control units which are dependent on networking of the individual traffic light installations using a central computer. Because of the required data link lines, traffic management and control systems assisted by a central computer are costly and suffer from the tendency to overloading of the control and decision center. Furthermore, the programs and control routines are not sufficiently adaptive to react to sudden and random changes in the traffic situation.

On a general basis, it can be stated that the green-wave method, which contains control schemes calculated in advance, necessarily attempts to make the traffic flow with predetermined patterns, such as fixed signal sequences or program procedures. However, since in reality the traffic flow varies, the requirement for reaction functions from the signal controller soon became obvious, and this led to further development of the traditional systems. However, the systems which have resulted from this operate optimally only in idealized conditions and have a disadvantageous effect on the proximity method on which they are based.

More recent developments have integrated greater adaptability, with the local control being based on the prediction of the amount of traffic in a global network of traffic routes in which local intersection controllers are integrated. These models and methods, which are known from the prior art, require large amounts of data and a very large amount of processing effort. To do this, the global coordination requires data continuously which is difficult to obtain or to evaluate online. Furthermore, global optimization implies high sensitivity to procedures that take place a long distance away, unnecessarily restricting the flexibility for adaptation to local procedures.

Overall, the methods according to the prior art have the common disadvantage that the systems react only with difficulty or in an unreasonable manner to exceptional events, for example in the case of accidents in traffic networks or on roadworks, or other temporary changes in the road network, failures of data lines, control installations or central computers, natural or industrial disturbance factors, catastrophes or even terrorist attacks.

BRIEF SUMMARY OF THE INVENTION

One object of the invention is therefore to provide an adaptive method for coordination of concurrent processes or for control of the transport of mobile units in networks, which method has a high degree of flexibility and is highly robust when local failures or disturbances occur.

The object of the invention is achieved by a method for coordination of competing dispatch processes, for example the transport of mobile units within a network which has node points and edges. In this case, the node points are equipped with control units and the nodes and/or edges are equipped with data acquisition elements, for example sensors, for acquisition of data, and have a limited dispatch capability for units to be controlled. The edges which link the node points have a limited buffer capacity for units which can be accommodated, with a (switching) state of dispatch of mobile units, a (switching) state of non-dispatch, and, between each of them, a changeover switching state being assumed at the nodes, by means of the control units. The method is characterized in that a the network is controlled on a decentralized and self-organizing basis in the control units of the node points or locally limited subnetworks, with the control units of adjacent node points or subnetworks being connected to one another for data interchange, and in that b1 data from prediction models of the local process procedures at the respective node and/or data from prediction models of the local process procedures at adjacent nodes, and/or b2 data from data acquisition elements of the respective node or of the edges connected to it, and/or data from data acquisition elements of adjacent nodes or of the edges connected to them c are used for local simulation and optimization of switching sequences of the control unit in order to determine the performance of the nodes or subnetworks taking into account the buffer capacity of the edges on the basis of models for short-term predictions with fixed assumed switching states of adjacent nodes, with c1 a plurality of high-performance switching strategies being produced for the subnetworks by a combination of high-priority switching sequences for the relevant individual nodes, and c2 a test of the high-performance controllers being carried out in the subnetworks, and, subsequently, c3 that control strategy which has the best performance being selected and the associated control signals for the relevant nodes being output.

The method is preferably characterized in that the destination functions for adjacent nodes included in the local simulation and optimization in method step c are weighted as a function of their distance from the boundaries of the subnetwork. In particular, the nodes are given lower weightings in the edge area of the respectively optimized subsystem.

By way of example, the weighting in the decentralized control method can be carried out by means of the expression $$\sum_{i,j} \int_{t_0}^{t} dt' w_{ij}^n f_{ij}^n(t')$$

which is maximized for optimization of the control process. In this case, $w_{ij}^n$ represents the weighting which the dispatch from the edge i to j at the node n should have for optimization, and $f_{ij}^n(t)$ represents a required function or weighting function. The method according to the invention preferably has the following characteristics for the simulation and optimization in method step c:

d1 when there is little demand for the mobile units at the nodes, a single dispatch of the units is carried out without any waiting times, so that the number of dispatched units is proportional to the average number of arriving units, whereby d2 when there is a high demand with unavoidable waiting times, the units are dispatched in groups by means of relatively long switching phases for minimizing the switching losses, with d3 the process of minimizing the switching losses being combined as required with the prioritized dispatch of mobile units close to the destination in order to quickly remove them from the network, d4 switching time losses being more than compensated for by premature switching in favor of synchronization of adjacent dispatch switching states by means of a predicted higher dispatch capability at adjacent nodes, d5 buffer capacity being reserved in the case of a high demand in the edges following the node, with the buffer capacity provided per edge being adaptively matched, d6 prioritization, on the basis of which the units are dispatched at the nodes, being possible on the basis of individual characteristics of the units, and in that d7 the maximum duration without any dispatches is restricted in the case of an extremely high demand by ensuring the setting of quota.

One advantageous refinement of the invention provides that the required model parameters are determined by a combination of a plurality of alternative simulation and measurement data items and that if the measurement data according to method step b2 is missing or implausible, the missing or unusable data is estimated by a prediction model, and/or that if the simulation or measurement data according to method step b1 is missing or implausible, the process is controlled on the basis of fixed predetermined control (fixed-time control).

A further refinement of the invention is characterized in that, when there is a high demand with waiting times at the nodes, units which are otherwise associated with dispatch flows that are subject to conflict, are dispatched individually at appropriate time in parallel with the dispatch of units in groups.

Where necessary, the units transmit data relating to their destinations to the control units of the closest nodes.

The method according to the invention can preferably be used for control of a traffic network, with the nodes in the network representing the crossings and the control units representing the traffic lights, and with the edges representing the road sections and the mobile units representing vehicles and/or pedestrians in the traffic network.

Furthermore, the method can be used for controlling production processes. In this case, for example, the nodes represent production machines, the control units the machine controller, the edges the transport paths and buffers between the production machines, and the mobile units represent the products that result from the production process. Different destinations correspond to different product types (articles), and different routes correspond to the various production procedures.

According to a further refinement of the invention, the method according to the invention can be used for controlling the logistics of goods transport, with the nodes representing the transfer points, the edges representing the transport paths, and the mobile units representing the transport goods.

When applied to the coordination of organizational procedures, the units correspond to the processes and the nodes correspond to the workers, while the edges describe the management or feed paths of the processes. The controller corresponds to the prioritization decisions made. The program procedures can be dealt with in a corresponding manner, in which the nodes correspond to program modules which process the data. The passing on of data between program modules defines the edges of the network for successive processing processes. The controller is used for coordination and harmonization of the processes in order to make better use of processing capacities, and for faster action.

One possible extension to the field of application of the control method according to the invention occurs in the field of biotechnology and medicine. In the end, it is also possible to describe the distribution of substances or active substances in cells, tissues or organisms as a logistic process. The proposed control method could therefore be used to manipulate this distribution process, for example for more specific use of medicaments.

A traffic network which is suitable for carrying out the method according to the invention has a multiplicity of crossings, road sections, sensors and traffic light installations with computer- or processor-assisted control devices, and is also characterized in that the crossings have associated traffic light installations and crossings or road sections have associated sensors, with the control devices being connected to the sensors in order to receive data, and with the control devices for adjacent traffic light installations being connected in order to interchange data.

According to one preferred refinement of the invention, the data link between the sensors and the control devices for the traffic light installations as well as between the control devices for adjacent traffic light installations are wire-free. For example, the data links may be implemented as a wireless LAN (WLAN), as Bluetooth, as an infrared link, as a radar signal, as a laser link or in the form of their further developments.

For the purposes of the described invention, the expression a network should be understood as meaning a multiplicity of nodes and edges which are connected to one another. On the basis of the described main field of application of the invention, the expression node should be understood as meaning a road crossing, although it is also possible to apply the principle according to the invention to complex production or organizational processes, and to organizational processes or program procedures, in which case, by way of example, a node there would correspond to a processing machine, a worker or a data processing process.

In a traffic network, an edge corresponds to a road section, in a production process it corresponds to a transport path to the products from one processing step to the next or an (intermediate) buffer, and in an organizational process or program procedure, for example, it corresponds to data being passed on or interchanged.

The dispatch capability of a node corresponds to its maximum throughput while, in contrast, the buffer capacity of an edge corresponds to its maximum accommodation capacity for units, that is to say the maximum queue length. Furthermore, the dispatch duration corresponds to the time interval taken for a unit that is being dispatched to leave the node, that is to say the time interval which passes between a unit leaving the previous edge and reaching the edge following that node.

The expression prioritization should be understood as meaning an optimized dispatch scheme, since the prompt arrival of units at a node leads to the dispatch capability being exceeded or to dispatch conflicts at the node, and the units to be dispatched must be prioritized with respect to other units in order to achieve an optimum dispatch result.

A control unit represents a system element which makes prioritization decisions for the sequence and/or parallelity of control and dispatch processes. A control unit is in each case associated with a node and, for example, on the basis of the main field of application of the invention, is in the form of a traffic light installation.

The switching state for dispatch of mobile units at the node corresponds in the case of a traffic network to a green traffic light, and the switching state for non-dispatch corresponds to a red traffic light. A changeover switching state is provided between these switching states, and corresponds to an amber traffic light.

It has been found that the independence of the local controller from the central closed-loop or open-loop control centers allows a desired degree of flexibility. In order to solve the stated problem, an autonomous adaptive control method is conceptually proposed, based on demand-sensitive self-organization of node points, leading to reasonable dispatch operation and, furthermore and in a worthwhile manner, synchronization patterns are produced automatically, as in the case of a green wave in traffic networks.

In this case, it has been found to be particularly advantageous for the method according to the invention to take account not only of the demanded capacity associated with a traffic flow of mobile units but, furthermore, also of the available or offered capacity of the subsequent network edges.

Figure 1:
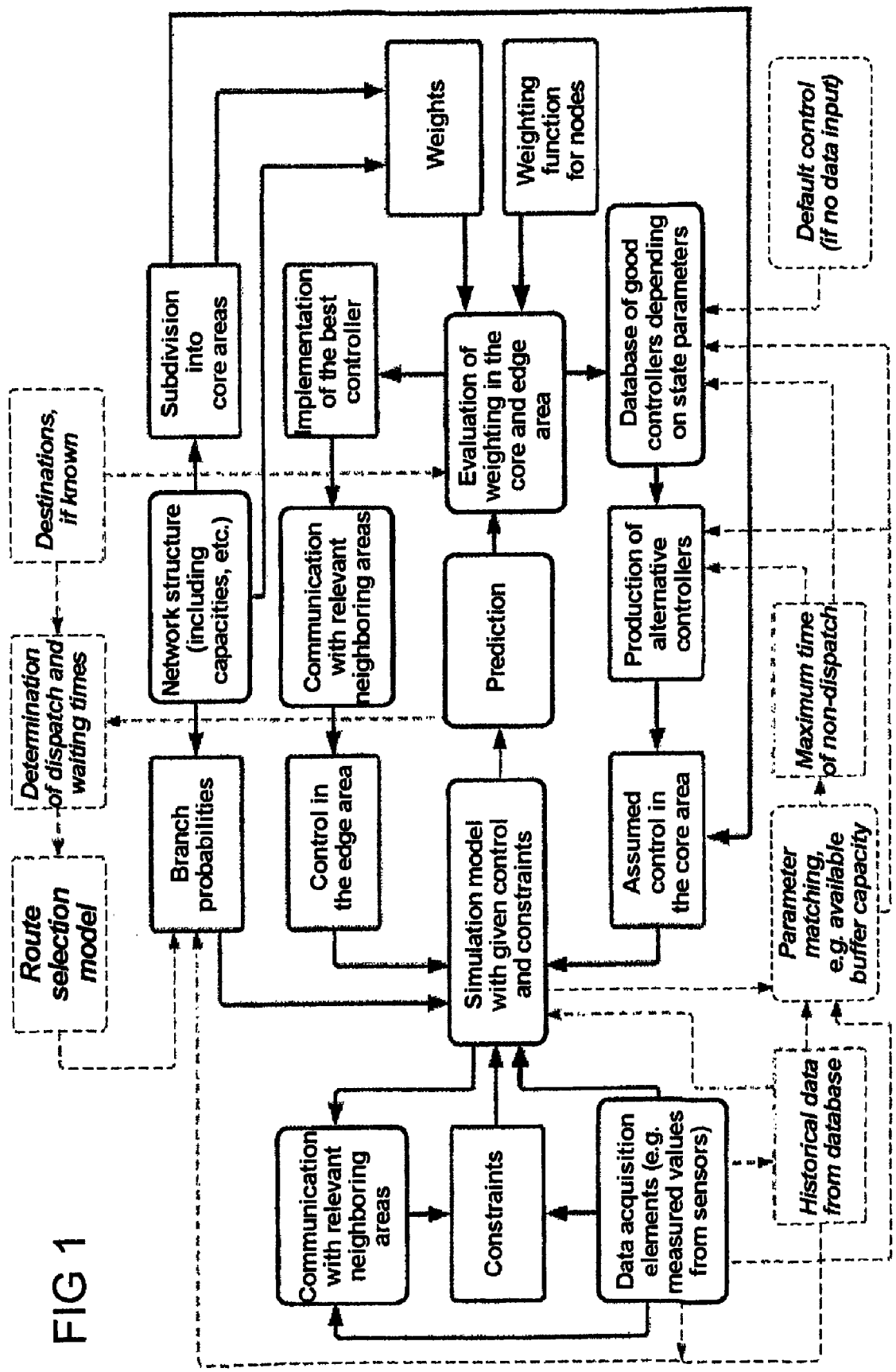
FIG. 1 is a flow chart illustrating the concept of self-organizing control of nodes by means of a suitable coordinate mechanism.

The concept, which can be generalized, will be explained in the following text using the example of a method for controlling a traffic network. According to the concept of the invention, a principle is proposed for provision of self-organizing control of nodes by means of a suitable coordinate mechanism. The concept is illustrated in FIG. 1.

DESCRIPTION OF THE INVENTION

1) The (road) network, which is composed of edges (roadways in one direction, road sections) and nodes which connect them (connecting pieces, crossings) is first of all subdivided into so-called core areas n. By way of example, these may correspond to individual nodes, or else to the nodes which are located within a square or hexagonal cohesive subsystem, or cohesive subsystem defined in some other way. By way of example, FIG. 2 illustrates subsystems which have been chosen to be square (thick lines).

Figure 2:
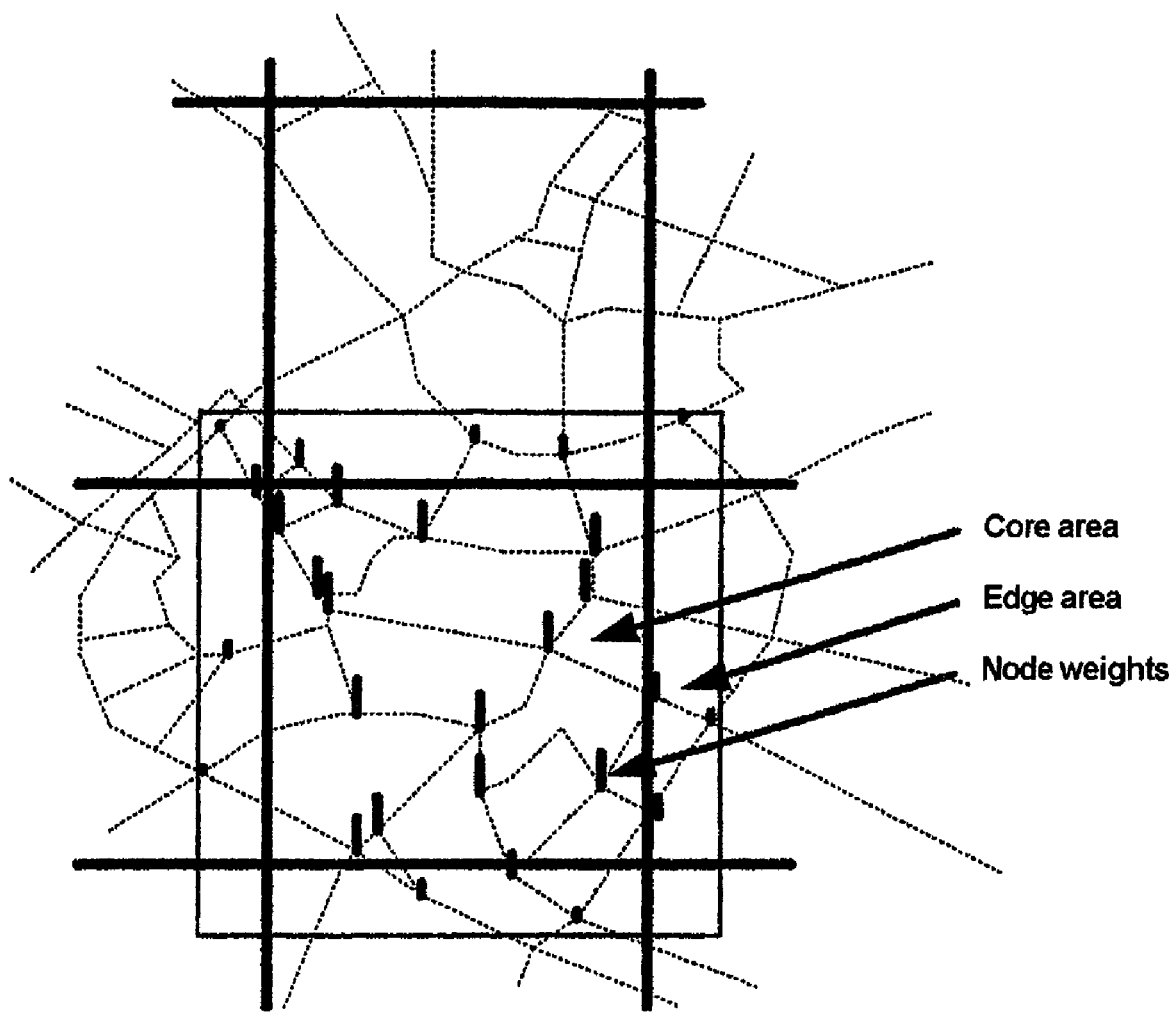
FIG. 2 is a diagram illustrating subsystems.

2) An associated edge area is defined for each core area and, in FIG. 2, is surrounded by thin, solid lines. This defines the fact that the units (vehicles or others involved in the traffic) located in it can reach or influence the core area within an optimization time horizon T' which can be predetermined, or how far the units which are located in the core area can travel within this time. Together, the core area and its edge area define a subnetwork in which the (light-signal) control is locally optimized. If the core area comprises a single node, it is in principal sufficient to restrict it to the subnetwork in which vehicles can be affected by the traffic lights switching at the node n and should therefore be able to influence the traffic light switching. This results in a restriction to the radius which can be traveled over by vehicles during the maximum green time T'. This radius corresponds to approximately one quarter to one half of the maximum legally stipulated cycle time T. Within this time, only those vehicles which are located within the radius $V_0T'$ of the light-signal installation influence the situation that governs the light-signal installation, with $V_0$ being the maximum legally stipulated speed. De facto, it is even possible to introduce a restriction to the radius $\overline{V}T'$, where $\overline{V} \approx V_0/3$ represents the mean speed in the impeded traffic. It should be noted that, when there is little traffic, and the mean speeds are high, the optimum green times are short in order to shorten the waiting times of the vehicles. For city traffic, it is therefore worthwhile taking account of a radius of about 300 to 500 meters in the local (decentralized) light-signal optimization. Greater radii can lead to somewhat better results, and shorter radii to considerably poorer results. However, because of the decreasing prediction accuracy of traffic prediction over lengthy time periods, there is little point in choosing T' and thus the radius to be much greater than that stated. In consequence, decentralized control can operate close to the system optimum; with considerably greater flexibility.

3) Light-signal optimization represents a combinational so-called NP-hard optimization problem in which the required computation time increases more than polynomially with the system size and the number of nodes, so that even super computers may be overloaded when determining the optimum solution in real time. Optimization using subnetworks considerably reduces the number of possible solutions, and therefore the computation time. A decentralized optimization process such as this can produce good overall solutions when and only when the optimization method coordinates the control processes of adjacent areas, that is to say areas linked via edges, and matches them to one another, and this is achieved by means of the invention. In this case sufficient and furthermore suitable parameters must be varied and this can be achieved, inter alia, by the choice of the size of the subsystems and of the optimization time horizon, or else by the optimization depth, that is to say the number of alternative solutions that are compared.

A decentralized optimization approach such as this can therefore achieve very good solutions because, although as a rule only a single optimum solution (control process) exists, the number of virtually optimum solutions increases rapidly, however, even at a short distance away from the optimum solution. The optimization strategy is therefore to achieve virtually system-optimum solutions by decentralized but coordinated optimization, with drastically increased numerical performance. From the virtually system-optimum solutions, those which are chosen are those which are most appropriate at the same time for the local circumstances.

In consequence, the proposed invention is less sensitive to processes taking place well away, and concentrates more on greater adaptivity and flexibility in response to the local scenario.

4) In the core areas, the control process is optimized in specific time steps, for example in time steps which are comparable to the switching time τ.

5) The control process provided during the planning horizon T' is normally not changed in the associated edge area for optimization in the interior of a core area. Fixed-time switching operations or control processes predetermined in some other way at individual nodes are taken into account in the optimization process as constraints which are dependent on time but cannot be varied.

6) All those nodes, or if necessary even the individual dispatch units (light-signal installations) are provided by the subsystem with n dependent weights $w_{ij}^n$; whose magnitude is illustrated in FIG. 2 by the length of the vertical bars adjacent to the nodes of the roads, which are represented by dashed lines. According to the invention, the choice of the weights plays a critical role in the performance and the quality of the solution in the overall system, and all the core areas. As one example, we will assume in the following text that the weights in the interior of the core area are equal to 1 and that those outside the respectively decentralized-optimized core and edge areas are set to be equal to 0. The latter makes the optimization method considerably more efficient. As a further explanation, we will now discuss three examples of specifications of the weights in the edge area of a core area:

a) If the weights in the edge area are set to be equal to 0, then adjacent core areas are ignored in the optimization process. Coordination between neighboring areas is therefore improbable, and the expected solution is well away from the system optimum. This optimization process could be referred to as "egotistical local control", and could be compared with "suboptimization".

b) The weights in the edge area are chosen in the same way as within the respectively considered core area (equal to 1) in the way that this is done in conventional parallelization algorithms using the halo method, with the halo corresponding to the edge area: in this situation, high sensitivity is expected in comparison to situations occurring well away, thus restricting the flexibility of the reaction to local events. Furthermore, it is possible for the optimization to be adapted to a control process in the edge area which in some circumstances is in fact revised in the next time step, thus preventing effective coordination. Problems such as these often occur when attempting to match a number of processes to one another in the same time scale.

c) We therefore propose that the weights in the edge area be chosen such that they fall to 0 in a suitable manner as the distance from the respective core area increases, that is to say they become smaller the longer the units required to enter the core area. This leads to consideration of adjacent core areas. This means that suboptimum solutions (in the same way as additional waiting times) are in some circumstances accepted when they are more than compensated for in the edge areas. This optimization approach requires coordination between neighboring areas and synchronized control processes. It can therefore be referred to as "altruistic decentralized control" and, according to the invention, leads to virtually system-optimum states. Situations occurring a long distance away in this case have little influence on the local situation, while the local situation and the situation in neighboring areas is taken into account. A further advantage is that, in contrast to variant b), a minor shift of the core areas in general leads to similar solutions. The specification of the core areas is therefore not as arbitrary as in the case of the process b). For similar reasons, this reduces the revision problem with the method b).

7) It is worthwhile carrying out the local (decentralized) optimization process in the core areas using a database-assisted method. Fixed time control as well as a specific number B of the best previous light-signal control processes are (optionally) stored in the database, to be precise in one preferred embodiment as a function of parameters which characterize the situation in the respective subnetwork, such as the amount of traffic in the core or edge areas and the mean filling level $$\sum_i l_i(t)/L_i$$

of the road sections. Parameters such as these may be raised as part of the method, for example by exponential or sliding averaging of simulation values or measured values, where empirical values stored in the database relating to the traffic situation on comparable days, or as (fit) functions of specific simulation values or measured values.

These control processes stored in the database represent the starting point for production of alternative control processes by variation of individual control parameters. If their weighting is better than the Bt-best control process stored in the database, then they replace the latter, provided that the solution is in accordance with the regulations or technically possible. Otherwise, it is rejected. A procedure such as this results in a gradual learning effect, that is to say the predefined initial set of good solutions becomes ever better and is finally stabilized, thus resulting in a certain degree of regularity in the system control. This is desirable to allow drivers to make use of the control process in their route selection behavior. Furthermore, variation of the best control variants has the advantage that there is no need to start from square one again for each optimization process (as, for example, in the case of enumerative methods), but it is possible to make considerably better use of the short optimization time available, thus allowing optimization of larger core areas, and therefore making it possible to obtain better solutions.

As described, the control method learns ever better control variants which depend on the network topology and on the state variables for the system, but which react flexibly to the respective traffic situation occurring locally at all times.

8) The process starts with the optimization using a suitable fixed-time control process, which is the default level (if sensors fail). However, new variants are tested in every clock cycle. When the control process is varied, the following control parameters, by way of example, are varied for those nodes in the core area which are not controlled by a fixed program: changeover switching time, next controlled signal group etc. on a slower time scale, possibly also parameters such as the planning and optimization time horizon, etc.

The variants according to the invention which are particularly promising are produced and tested first of all in order to improve the numerical efficiency of the optimization process, since the number of variants which can be tested in each time step is restricted by the computation power. This applies, for example a) to the selection of the signal groups, b) to the variation of the green times and c) to the variation of the changeover switching times:

a) First of all, in order to reduce the complexity, the combinations of the green phases on all the adjacent traffic lights to a crossing are restricted to the compatible green switching operations, that is to say to the green switching operations which are free of conflicts and are guaranteed to be accident-free.

The number of green phases and switching combinations can be reduced considerably if the only ones that are considered are those for which only compatible flows are dispatched jointly, that is to say are assigned as being green. Flows are compatible when their driving lines do not cross. These "safe" combinations should not, however, be confused with the conventional traffic light phases, where compatible flows are necessarily jointly controlled. In this case, by way of example, it is also possible to indicate green only a single right-turning lane, while all the other traffic lights indicate red. This is worthwhile when route capacities for other traffic flows are required more urgently and are therefore better kept free (reserved). The "all traffic lights red" state is also safe and is therefore permissible. It may be worthwhile to allow faster enabling for arriving individual vehicles. The number of all safe (compatible) switching combinations is found by eliminating from the list of all possible combinations those for which incompatible flows have green at the same time.

b) Furthermore a good initial value can be defined for the green time period based on a request and offer principle: for this purpose, an optimization principle is used for an individual node which determines how many vehicles could be dispatched in a specific green time. In this case, interaction effects between adjacent nodes are initially ignored. However, the available space in the connecting roads is taken into account by time-dependent specification of the function $Q_i^{dep}$ (t') (see paragraph 9). The number $N_i'(t)$ of vehicles leaving that road section between the present time $t_0$ and the time t can be estimated to be:

$$N_i'(t) = l_i \int_0 dt' Q_i^{dep}(t'), \qquad (1)$$

where $l_i$ is the number of lanes which lead in the same direction and $Q_i^{dep}(t')$ is the vehicle flow leaving that road section i at the time t'. $Q_i^{dep}(t')$ is equal to 0 when there is no available capacity in one of the downstream road sections. In comparison to this, the number $N_i(t)$ of vehicles leaving that road section between the present time $t_0$ and the time t if the lights were to be switched to amber at the time $t_0$ and to green at the time $t_0+\tau$ can be estimated to be:

$$N_i(t) = \int_0 dt' T_i Q_i^{dep}(t') = \int_{0+\tau} dt' T_i Q_i^{dep}(t') \qquad (2)$$

where $\tau$ denotes the switching time. The formula $$\Delta N_i(t_0) = l_i \int_0^{0+\tau} dt' Q_i^{dep}(t') \qquad (3)$$

reflects the switching time loss, that is to say the number of vehicles which would be lost from the dispatch process as a result of switching between dispatch from different directions (the amber time/lost time $\tau$).

The predicted values for the numbers of vehicles which can be dispatched before the time t from all of the traffic streams which can be dispatched at the same time, $i \in I$, that is to say all the compatible green phases, are now added:

$$N_I(t) = \sum_{i \in I} N_i(t) \qquad (4)$$

etc. The following information must then be defined for one individual crossing: If the signal group J (that is to say the corresponding combination of compatible green times) were to be switched to green at the present time to, then this would result in dispatch of the greatest possible number of vehicles before the time t provided that the expression $$N_J(t)-N_J'(t)=N_J(t)-N_J(t)-\Delta N_J(t_0) \qquad (5)$$

assumes the maximum value for all possible signal groups J. Provided that the expression is negative, it is best to continue to use the currently active (that is to say green signal group. In order to switch from control of the signal group/to the signal group J, the value $N_J(t)$ must therefore work out to be better at least by the threshold value $\Delta N_J(t_0)$ than the value $N_J(t)$ in order to compensate for the switching losses. The switching losses $\Delta N_J(t_0)$ must therefore be more than compensated for, and the signal group must furthermore be able to dispatch the greatest number of vehicles before the time t.

For coordination with adjacent crossings, it is in some circumstances worthwhile also considering second-best and third-best solutions. This is also justified by the fact that, currently, the choice of the time horizon $\Delta t = t - t_0$ is still open, on which the best choice of the signal group may depend.

The dispatch rates of vehicles per unit time are thus defined, that is to say the throughputs:

$$Q_J(t) = \frac{N_J(t)}{t - t_0} \qquad (6)$$

This compares with the value $$Q_I'(t) = \frac{N_I'(t)}{t - t_0} = Q_I(t) + \frac{\Delta N_I(t_0)}{t - t_0} \qquad (7)$$

for continuation of the current green phases. The additional term $\Delta N_I(t_0)/(t-t_0)$ always results in a certain tendency to continue the current green phases, although this is not unconditional, but precisely considers switching losses.

The values $Q_J(t)$ and $Q_I'(t)$ which result for different signal groups J and times t can be ranked. This determines the preference for the choice of different signal groups, that is to say their priority from the point of view of a single node. For example, all the signal groups whose respective value $Q_I'(t)$ or $Q_J(t)$ is no more than a specific percentage ε below the best solution at one of the times t are taken into account. Specifically, it may be advantageous to choose a signal group with a high but not the highest priority if this makes it possible to achieve coordination with traffic light switching operations at adjacent nodes. This makes it easier to achieve synchronization between adjacent nodes. All the high-priority signal groups are therefore considered for a green switching operation. Very low values $Q_I'(t)=N_I'(t)/(t-t_0)$ give cause to terminate the control of the road section i, that is to say to switch the corresponding traffic light to red.

The invention is not restricted to the exemplary embodiment, as described here, for identification of particularly promising control processes for individual nodes.

c) A further delay is tested only if a short delay of a switching time has led to an improvement. Variation of the end of the green time period sensibly start with the mean traffic-state-dependent green time duration in the past.

9) The traffic dynamics in the subsystem are determined for given constraints and with assumed control processes on the basis of a suitable traffic model and taking into account the turning probabilities of the vehicles, which may be determined using sensor measurements or conventional estimation models. If the amount of traffic in the edge areas and the relationships for the turning probabilities $\alpha_{ij}(t)$ are known or have been suitably presupposed, the traffic flows in the network can be predicted over short time periods for any desired combination and switching sequence of the light signals. Various models have been developed for this purpose in the past, such as vehicle following models, cellular automatic systems, fluid-dynamic traffic models, etc.

By way of example, the time-dependent traffic flow in networks can be described approximately using the following formulae (or using formulae with a similar content or a similar effect): First of all, the network is subdivided into homogeneous road sections (direction roadways) i with a constant number of lanes, $l_i$. The traffic flow of approaching vehicles at the time t is annotated $Q_i^{arr}(t)$ and the traffic flow of the vehicles leaving that road section is annotated $Q_i^{dep}(t)$. The turning probability (relative turning frequency) at the time t from the road section i into an adjacent section j is assumed to be $\alpha_{ij}(t) \geq 0$. Since the number of vehicles is constant, then:

$$l_j Q_j^{arr}(t) = \sum_i l_i Q_i^{dep}(t) \alpha_{ij}(t) \quad \text{where} \quad \sum_j \alpha_{ij}(t) = 1. \qquad (8)$$

It is also possible to distinguish between vehicles with different destinations d, by a simple generalization.

The actual arriving flow $Q_i^{arr}(t)$ is restricted by the maximum available or offered capacity $Q_i^{arr,pot}(t)$ (the "offer"), the actual departing flow $Q_i^{dep}(t)$ is restricted by the maximum demanded capacity $Q_i^{arr,pot}(t)$ ("the demand"). In the best case, this results in the minimum of "offer" and "demand" at a node, that is to say:

$$l_j Q_j^{arr}(t) \leq \min\left[l_j Q_j^{arr,pot}(t), \sum_i l_i Q_i^{dep,pot}(t) \alpha_{ij}(t)\right] \qquad (9)$$

for all j. Together with $$0 \leq Q_j^{arr}(t) \leq Q_j^{arr,pot}(t) \quad 0 \leq Q_i^{dep}(t) \leq Q_i^{dep,pot}(t)$$

and equation (8), suitable values $Q_i^{dep}(t)$ can be determined from this, for example by solving an equation system. In this case, the offered capacity per lane is determined using the formulae:

$$Q_i^{dep,pot}(t) = \begin{cases} Q_i^{arr}(t - L_i/V_i^0) & \text{if } l_i(t) = 0, \\ Q_i^{max} & \text{if } l_i(t) > 0, \end{cases} \qquad (10)$$

in which case the vehicles which are furthest away from the downstream end of the road section i are located at the point $l_i(t)$. If there are no vehicles on the section i, that is to say there is no traffic ($l_i(t)=0$), then the departing flow from the road section i is given per lane by the arriving flow $Q_i^{arr}$ of vehicles at the time $t-L_i/V_i^0$. In this case $L_i$ denotes the length and $V_i^0$ the maximum permissible speed, and $L_i/V_i^0$ denotes the free (unimpeded) driving time on the road section i. If there is a queue on the road section i ($l_i(t)>0$), the maximum departing flow $Q_i^{max}$ from the jam per lane governs the traffic flow of vehicles leaving the road section i. The offered capacity per lane is given by:

$$Q_j^{arr,pot}(t) = \gamma_{ij}(t) \times \begin{cases} Q_j^{max} & \text{if } l_j(t) < L_j, \\ Q_j^{dep}(t - L_j/|c|) & \text{if } l_j(t) = L_j. \end{cases} \quad (11)$$

In consequence, the potential arriving flow is equal to zero when the traffic lights are red from the road section i to the road section j ($\gamma_{ij}(t)=0$). When the traffic lights ($\gamma_{ij}(t)=1$) are green, a maximum traffic flow $Q_i^{max}$ can be absorbed by the road section j, provided that the jam does not extend to the end of that section ($l_j(t)<L_j$). However, when $l_j(t)=L_j$, the maximum arriving flow is governed by the departing flow $Q_j^{dep}$ from the road section j at the time $t-L_j/c/$, where $c \approx -15$ km/h is the speed of propagation of disturbances in the impeded traffic.

The development of the position of the end of the jam over time can be calculated using the following formula:

$$\frac{dl_i}{dt} = -\frac{Q_i^{arr}(t - [L_i - l_i(t)]/V_i^0) - Q_i^{dep}(t - l_i(t)/|c|)}{Q_i^{arr}(t - [L_i - l_i(t)]/V_i^0)/V_i^0 - [1 - \tau' Q_i^{dep}(t - l_i(t))/[c]]\rho^{jam}}. \quad (12)$$

In this case, $l_i(t \leq L_i$ is the distance from the downstream end of the road section i, $V_i^0$ is the maximum permissible speed, $\tau'=1.8$ s is the safe separation time between vehicles, and $\rho^{jam}$ is the vehicle density per lane in the traffic in the jam (for example waiting at a red traffic light).

Instead of the (approximation) formulae mentioned above, it is also possible to use formulae with a similar content or a similar effect. Finally, the maximum vehicle capacity on the road section i is governed by the number of lanes $l_i$ and the length $L_i$ of a road section i. This is calculated using the formula $$l_i L_i \rho^{jam} \quad (13)$$

10) The discussion so far is related to calculation of the time-dependent traffic flows as a function of the traffic light switching operations, which result from the time-dependent values of $\gamma_{ij}(t)$. We now turn to the specification of the weighting method and selection method for more powerful light-signal control systems for the purposes of the proposed local optimization approach, that is to say for the purposes of the decentralized control method.

If the control aim is to optimize the vehicle throughput which is handled between the time $t_0$ and $t_0+T'$ by the light-signal installations, then, for example, the following expression is maximum:

$$\sum_{ij} \int_0^{0+T'} dt' I_i Q_i^{dep}(t') \alpha_{ij}(t') = \sum_i \int_0^{0+T'} dt' I_i Q_i^{dep}(t'), \quad (14)$$

with the addition process extending over all the changes handled by the light-signal installations from a road section i to a road section j. If the road section i does not lead into the road section j, then $\alpha_{ij}=0$.

Instead of global optimization, that is to say system-wide optimization, which is not feasible to calculate, the decentralized control method according to the invention maximizes the performance measure $$\sum_{i,j} \int_0^{0+T'} dt' w_{in}^n I_i Q_i^{dep}(t') \alpha_{ij}(t') \quad (15)$$

in the subnetwork n. In this case, $w_{ij}^n \geq 0$ denotes the weighting given to the traffic light control for the change from the road section i to the road section j (see paragraph 6). If $w_{ij}^n$ is chosen such that it decreases, as stated in paragraph 6c) and as illustrated symbolically in FIG. 2, then this takes into account the throughput at adjacent nodes, and cooperation to increase the throughput can be achieved in the neighborhood.

The performance (15) can be generalized to any desired optimization criteria:

$$\sum_{i,j} \int_0^{0+T'} dt' w_{ij}^n f_{ij}^n(t') \quad (16)$$

In this case, $f_{ij}^n(t)$ denotes any desired weighting or required function of simulation or measurement variables of the edges i and j or of the node linking them, at the time t. For example, the following factors may be considered:
a) the number of waiting units (queue length),
b) the control and/or waiting times,
c) the number of arriving units,
d) the number of dispatched units,
e) the potential dispatch capability,
f) the buffer capacity,
g) the priority of the units (for example rescue vehicles, public local passenger vehicles),
h) a preferred dispatch quantity,
i) the energy consumption or the dispatch costs,
k) the proximity to the destination.

By way of example, vehicles that are close to their destination may be given heavier weightings in order to remove them from the system with priority (see paragraph k) (provided that appropriate information is available to the light-signal control system, for example by interchanging information with routing systems for vehicles). For this purpose, formula (2) could be replaced by:

$$N_i(t) = \sum_d \int_{0+\tau} dt' \frac{\overline{D}}{D_d} l_i Q_{id}^{dep}(t'), \quad (17)$$

In this case, $\overline{D}$ denotes the mean distance traveled by the vehicles in the road section i to their destination and $D_d$ the distance traveled by the vehicles in the road section i including the destination d. $Q_{id}^{dep}(t)$ is the vehicle flow of vehicles with the destination d, leaving the road section i at the time t. The expected traveling time may also be chosen as an alternative to the mean distance traveled. However, other formulae may also be used with comparable effect.

11) The proposed control method provides for large numbers of variable to be calculated in a plurality of ways in order to achieve a more reliable overall estimate $\overline{x}$. For example, the turning probabilities can be determined from adjacent sensor data (the relative turning frequencies), from traffic simulations and from route selection models on the basis of data relating to the driver destinations. When estimating dispatch times for a unit, it is also proposed that measured values and/or short-term predictions relating to nearby edges be given a stronger waiting while, in contrast, historic measured values are given stronger waitings at remote edges for comparable situations.

For redundant overall estimation $\overline{x}$ of a variable x, the individual simulation or measured values $x_k$ of various methods k are weighted with their reliability $z_k$ (for example the inverse of the standard deviation):

$$\overline{x} = \sum_{k=1}^n z_k x_k \Big/ \sum_{k=1}^n z_k. \quad (18)$$

The non-availability of one of these data sources does not endanger the functionality of the control process, making it robust to disturbances. If, for example, the n-th measurement or data source fails, the determining process is carried out using:

$$\bar{x} = \sum_{k=1}^{n-1} z_k x_k \bigg/ \sum_{k=1}^{n-1} z_k. \qquad (19)$$

corresponding to the reliability $z_n=0$ for the n-th value.

12) The maximum green time and cycle time are restricted when the amounts of traffic are extremely high, if necessary, by stockpiling. For this purpose, in principle, the green time is ended artificially if it exceeds a specific fraction $u_i^o$ of a maximum cycle time T within a time interval T. By way of example, the fraction $u_i^o$ may be chosen such that it is specified in proportion to the relative amount of traffic, or on the basis of user aspects or system-optimum aspects.

13) It is particularly advantageous to operate the installation together with a green arrow for those turning right, in order to allow individual dispatch, in parallel, of vehicles in suitable time gaps, even during linked operation when there is a large amount of traffic. This is of particular importance for side roads with a small number of lanes.

14) A high degree of attention may be paid to side roads i with a small number of lanes $l_i$ by artificially increasing the parameter $l_i$ in the optimization formulae. In particular, the importance of the number of lanes is ignored by generally setting $l_i=1$ in the optimization formulae. This leads to main roads and side roads being handled with equal priority, although this does increase the average traveling times.

15) Once the optimum network control process has been determined, the dynamics of the individual units along the edges can in addition also be optimized in order, for example, to avoid unnecessary fuel consumption by excessive braking and acceleration. This is dependent on the units receiving information and/or instructions from the signal control system, for example by means of vehicle infrastructure communication.

16) The optimization method outlined in paragraphs 1) to 14) can be modified such that it is suitable for optimization of the network structure. This is done by adding or removing edges or nodes from or to the system and/or their numbers of lanes and capacity, and if appropriate also turning bans. Optimization such as this has applications for traffic planning, in particular, and can also be carried out off-line.

The characteristics of the traffic control process proposed according to the invention can be described as follows:

The scheme for and the sequence of control of mobile units (vehicles or pedestrians) is determined on the basis of a short-term traffic prediction using assumed switching states of the adjacent traffic lights in a specific "arrival area" (subnetwork=core area and edge area), that is to say the optimization principle is applied only locally, and therefore defines a decentralized control principle. In consequence, this is the only step that requires combinational optimization, to be precise only for short time periods and for a small number of adjacent light-signal installations. The decoupling of control areas a long distance away and the coordination of neighboring areas are carried out by the lower weighting to the nodes which are further away in the edge area. Otherwise, local variation of traffic light switching could influence a light-signal installation at the other end of the town, in the event of global optimization. This would result in the light-signal control system being extremely sensitive to minor disturbances, which could be at the expense of the predictability of the system behavior (for example the turning probabilities), and could therefore lead to chaotic reactions by drivers to the unpredictably varying switching dynamics. This would in turn lead to poor overall system performance. A local control principal therefore achieves less sensitivity (more robustness) to events occurring a long distance away, in favor of greater flexibility in reacting to the situation and events occurring locally.

The procedure for decentralized control involves parallel switching decisions being made in all the areas n in which information is interchanged, preferably without the use of wires, between adjacent traffic light control systems, at regular time intervals, for example every two seconds. The switching decisions are based on the comparison of alternative control scenarios during a time horizon of maximum length $t-t_0=T'$, which may be chosen depending on the situation. A worthwhile time horizon corresponds approximately to the mean green time plus 2 to 3 times the standard deviation of the green time. This value may be chosen as an exponential or sliding mean value over a time window, as an empirical value or as a function of other measurement variables, such as the amount of traffic or the mean filling level of the road sections i in the area n.

The system does not work by combining with one another all the feasible combinations of green switching operations at the adjacent node points in an optimization area, but only switching operations with high priority, since it is improbable that a very poor switching operation at one node can be compensated for by a very much better switching operation at a neighboring node. This makes the optimization method efficient, together with restricting it to small subsystems (areas) of neighbouring light-signal installations. The intersection of the edges areas with neighbouring core areas and the falling weighting towards the edge of these areas makes it probable that the switching programs determined for neighbouring nodes are generally highly compatible with one another, that is to say the traffic lights behave cooperatively. The formula (3) is used to take account of possible changeover switching losses in the comparison of alternative control programs. In consequence, frequent switching is probable only when the traffic flows are low, where changeover switching losses are insignificant. When the amounts of traffic are greater, this ensures that there is a tendency to continue an existing green time for as long as the vehicles are being dispatched efficiently.

When the amount of traffic is low, a single vehicle in its own right corresponds to the longest "queue" and can therefore switch the traffic lights to green on its own. When there is little traffic, the units are therefore dispatched individually and directly on their arrival. In order to reduce the reaction times and changeover switching times, it is worthwhile choosing the basic state of the traffic lights to be red, if no further vehicle is following for a time interval which is greater than the changeover switching time $\tau$.

A vehicle approaching from a different direction can be handled more quickly by switching the traffic lights back to red after a vehicle has passed.

In order to avoid a vehicle having to brake at the traffic lights before being individually dispatched, the vehicle must be detected sufficiently far upstream of the traffic lights that sufficient time remains for changeover switching. If the maximum permissible speed of the vehicle is $V_0$ and the changeover switching time (amber phase) is $\tau$, then the sensor must detect the passing vehicles at a distance $I=V_0\tau$ from the light-signal installation. The changeover switching operation would have to start immediately on passing the point at the distance I. If, in fact, the sensor observes the traffic situation at the distance l'>l, then switching must take place at the latest after a time interval of (I−I')/$V_0$. The changeover switching time could be made dependent on the actually measured vehicle speed v and would ideally be (I'−I)/v, in order to minimize unused green times.

When the amount of traffic is greater, when individual dispatch is no longer possible without conflicts owing to vehicles arriving virtually at the same time or close to one another in time, the proposed control method results in bundling of units by relatively long green and red phases, based on the principle of minimizing the changeover switching losses. The bundling principle results automatically from the greater dispatch rate resulting from dispatch or identical units when the amount of traffic is greater (in comparison to individual dispatch of different units, which is linked to changeover switching times and time losses).

In the event of overloading, that is to say when a further increase in the units in the system reduces its throughput, the principle of minimizing the changeover switching losses can be combined with prioritized handling of vehicles close to their destination in order in this way to remove them from the system as quickly as possible and therefore to create space for other vehicles, that is to say to reduce jams and queues.

The light-signal control process described by way of example above has the primary aim of maximizing the throughput in order in this way to minimize the overall waiting times and to minimize the overall traveling times. The aim has therefore been assumed to be to handle as many vehicles as possible as quickly as possible. The proposed method for switching and coordination of the light-signal installations solves, inter alia, the following objective conflicts, by performance comparison of short-term traffic predictions for alternative control scenarios:

On the one hand, the aim is for the green phases to be as long as possible in order to reduce switching time losses, while on the other hand it is necessary to react "immediately" to events at neighbouring traffic lights, as is necessary in order to establish a green wave.

Despite a lack of buffer capacity in following road sections, important flows must be handled with priority since failure to handle them would lead to other flows being blocked. This may necessitate premature ending of the green time otherwise the system performance may deteriorate beyond a specific filling level.

The control system according to the invention, which has the typical features of a closed-loop control system, solves these objective conflicts by more than compensating for switching time losses by premature switching in favor of synchronization of adjacent green phases (green wave), by means of a predicted higher dispatch rate at the relevant neighbouring nodes. Such coordination of neighbouring crossings is achieved automatically by taking account of the traffic flows at neighbouring crossings. A proportion of the coordination gain is credited in a specific manner to the neighbouring nodes, in the form of additionally handled vehicles, with these neighbouring nodes having to accept losses, in comparison to their optimum control, for synchronization purposes. If this "credit" exceeds the losses, the relevant light-signal installation is involved in a coordinated switching operation.

A further advantage of the control process according to the invention is its robustness and fail-safety by virtue of redundancy: if, for example, the sensor input to one light-signal control system fails, then, for example, the control units would automatically be controlled on the basis of a fixed-time control system (reversionary level). In the same way, the turning probabilities $\alpha_{ij}(t)$ and the predicted dispatch times can be determined in a redundant manner.

Redundancy is also achieved by the data being automatically estimated by the simulation model on which the traffic prediction is based in the event of local failure of the measurements of the traffic situation. (Based on the principle of maintenance of the vehicle numbers, vehicles are not produced or are destroyed on a free route, so that simulation models can use local measured values to reconstruct or predict the traffic situation in between.)

Further advantages according to the invention include automatic reaction of the nodes to unexpected events such as accidents, roadwork or other unpredictable events which impede the transportation of the mobile units. Greater flexibility leads to cost savings, not least because there is no need to set up and maintain a central infrastructure and data lines, in comparison to traffic management systems using central traffic computers. However, the decentralized control method can also be implemented in any central infrastructure that may exist and can integrate existing fixed-time control systems or other predetermined control programs for individual nodes without any problems. However, the information gain and the data interchange are matched to the advantageous use of modern sensor technologies and wire-free communication methods.

Finally, it should be stressed that the proposed method is particularly adaptable, flexible and robust to local variations and failures in the system. In addition, it allows simple prioritization of public local passenger traffic, harmonically matched to the overall traffic system, that is to say with consideration rather than unconditionally. For this purpose, a public local passenger vehicle is provided with a higher weighting than a private car, for example on the basis of the average number of passengers.

The invention claimed is:

1. A method for coordination of competing processes or for control of a transport of mobile units within a network which has nodes and edges, with the network being subdivided into core areas n, each of which has an associated edge area so that the core area and the associated edge area each define a cohesive subnetwork of nodes and edges, with the edges having a limited buffer capacity for units to be received and with the nodes or edges being equipped with data acquisition elements, and with the nodes being equipped with a limited dispatch capability for units to be controlled and being equipped with control units for which a (switching) state of dispatch of mobile units, a (switching) state of non-dispatch and, between them, a changeover switching state are provided, wherein:

a the network is controlled on a decentralized and self-organizing basis in control units of the node points or locally limited subnetworks, with the control units of adjacent node points or subnetworks being connected to one another for data interchange, b1 data from prediction models of local process procedures at the respective node, data from prediction models of local process procedures at adjacent nodes, or data from both prediction models of local process procedures at the respective node, and data from prediction models of local process procedures at adjacent nodes, or b2 data from data acquisition elements of the respective node or of the edges connected to it, data from data acquisition elements of adjacent nodes or of the edges connected to them, data from both data acquisition elements of the respective node or of the edges connected to it and data from data acquisition elements of adjacent nodes or of the edges connected to them, or a combination of data according to b1 and b2 c are used for local simulation and optimization of switching sequences of the control unit in order to determine the performance of the nodes or subnetworks taking into account the buffer capacity of the edges on the basis of models for short-term predictions with fixed assumed switching states of adjacent nodes, with c1 a plurality of high-performance switching strategies being produced for the subnetworks by a combination of high-priority switching sequences for the relevant individual nodes, and c2 a test of the high-performance controllers being carried out in the subnetworks, and, subsequently, c3 that control strategy which has the best performance being selected in the respective core area of the subnetwork and being converted to corresponding switching states for the relevant nodes.

2. The method as claimed in claim 1, wherein destination and optimization criteria for adjacent nodes included in the local optimization in method step c are weighted as a function of the position in the respective local optimization region (subnetwork).

3. The method as claimed in claim 2, wherein the weighting is carried out in the decentralized control method by maximizing the expression $$\sum_{i,j} \int_{t_0}^{t_0+T'} dt' w_{ij}^n f_{ij}^n(t')$$

where $f_{ij}^n(t)$ denotes any desired weighting or required function of simulation or measurement variables of the edges i and j or of the node linking them at time t, $w_{ij}^n$ denotes the weighting, $t_o$ the start time of the optimization and T' the planning and optimization time horizon.

4. The method as claimed in claim 1, wherein, for the simulation process in method step c:

d1 when there is little demand for the mobile units at the nodes, a single dispatch, with equal priority, of the units is carried out without any waiting times, with the number of dispatched units being proportional to the average number of arriving units, d2 when there is a high demand with unavoidable waiting times, the units are dispatched in groups by means of relatively long switching phases based on the principle of minimizing the switching losses, with d3 the process of minimizing the switching losses being combined as required with the prioritized dispatch of units close to the destination in order to quickly remove them from the network, d4 switching time losses being more than compensated for by premature switching in favor of synchronization of adjacent dispatch switching states by means of a predicted higher dispatch capability at adjacent nodes, d5 buffer capacity being reserved as required in the edges following the node, with the buffer capacity provided per edge being adaptively matched, d6 prioritization, on the basis of which the units are dispatched at the nodes, being carried out on the basis of the characteristics of the units, and in that d7 the maximum duration without any dispatches being restricted by setting of quota.

5. The method as claimed in claim 1, wherein the local (decentralized) optimization uses a database-assisted method in which a number of high-performance control strategies are stored as a function of parameters which characterize the situation in the respective subnetwork and are raised as part of the method.

6. The method as claimed in claim 1, wherein the quota are set on the basis of criteria of user or system optimality.

7. The method as claimed in claim 1, wherein the required model parameters are determined by a combination of a plurality of alternative simulation and measurement data items.

8. The method as claimed in claim 1, wherein, in the process of estimating the predicted dispatch times of a unit, measured values, short-term prediction, or both measured values and short-term prediction are more strongly weighted on close-by edges, while in contrast historical measured values are more strongly weighted for comparable situations on remote edges.

9. The method as claimed in claim 1, wherein:
if the measurement data according to method step b2 is missing or implausible, the missing or implausible data is replaced by a simulation or estimation model, or
if the simulation or measurement data according to method step b1 is missing or implausible or if data according to both method step b2 and method step b1 are missing or implausible, the process is controlled on the basis of fixed predetermined control.

10. The method as claimed in claim 1, wherein units which are associated with incompatible dispatch processes, that is to say dispatch processes that are subject to conflict, are dispatched individually at appropriate times in parallel with the dispatch of units in groups.

11. The method as claimed in claim 1, wherein data relating to unit or process destinations is interchanged with the control units for the nodes for prioritized dispatch of units or processes that are close to the destination.

12. The method as claimed in claim 1, wherein continuous signals or control actions are used to coordinate concurrent processes or to control the transport of mobile units.

13. The method as claimed in claim 1, wherein the method is used to optimize a network structure by variations of nodes and edges.

14. The method as claimed in claim 1, wherein this method is combined with a method for optimizing the turning probabilities.

15. The method as claimed in claim 1, wherein the method is combined with a method for optimizing the dynamics of the individual units along the edges, with the units receiving information, instructions or both information and instructions from the signal controller.

16. Use of a method as claimed in claim 1 for control of a traffic network, with the nodes in the network representing the crossings and the control units representing the traffic lights, and with the edges representing the road sections and the mobile units representing vehicles or others involved in the traffic network.

17. Use of a method as claimed in claim 1 for controlling a production process, with the nodes representing the production machines or productive units, the edges representing the transport paths or intermediate stores between them, and the mobile units representing the products.

18. Use of a method as claimed in claim 1 for controlling logistics of goods transport, with the nodes representing the transfer points, the edges representing the transport paths, and the mobile units representing the transport goods.

19. Use of a method as claimed in claim 1 for coordination of organizational procedures, with the units corresponding to the processes and the nodes corresponding to workers, while the edges describe the management or feed path of the processes, and with the controller corresponding to the prioritization decisions made.

20. Use of a method as claimed in claim 1 for handling program procedures, with the nodes corresponding to the program modules which process data, with the data being passed on between the program modules defining the edges of the network of successive processing processes, and with the controller being used for coordination or harmonization of the processes.

21. Use of a method as claimed in claim 1 in the field of biotechnology for controlling the distribution process of substances or active substances in cells, tissues or organisms.

22. A traffic system having a multiplicity of crossings, road sections, data acquisition elements and traffic light installations with control devices which are suitable for carrying out a method as claimed in claim 1, wherein the crossings have associated traffic light installations and sensors, with the control devices being connected to the sensors in order to receive data, and in that the control devices for adjacent traffic light installations are connected to one another in order to interchange data.

23. The traffic system as claimed in claim 22, wherein the data link between the sensors and the control devices for the traffic light installations as well as between the control devices for adjacent traffic light installations is wire-free.

24. The traffic system as claimed in claim 23, wherein the data link is in the form of a wireless LAN (WLAN), as Bluetooth, as an infrared link, as a radar signal, as a laser link or as a variant thereof.

* * * * *

UNITED STATES PATENT AND TRADEMARK OFFICE
CERTIFICATE OF CORRECTION

PATENT NO. : 8,103,434 B2
APPLICATION NO. : 11/914759
DATED : January 24, 2012
INVENTOR(S) : Dirk Helbing et al.

It is certified that error appears in the above-identified patent and that said Letters Patent is hereby corrected as shown below:

Column 10,

Formula (1), " $N_i'(t) = I_i \int_0 dt' Q_i^{dep}(t')$ ," should read -- $N_i(t) = I_i \int_{t_0}^{t} dt' Q_i^{dep}(t')$ --

Formula (2), " $N_i(t) = \int_0 dt' I_i Q_i^{dep}(t') = \int_{0+\tau} dt' I_i Q_i^{dep}(t')$ ," should read -- $N_i(t) = \int_{t_0}^{t} dt' I_i Q_i^{dep}(t') = \int_{t_0+\tau}^{t} dt' I_i Q_i^{dep}(t')$ --

Formula (3), " $\Delta N_i(t_0) = I_i \int_0^{0+\tau} dt' Q_i^{dep}(t')$ ," should read -- $\Delta N_i(t_0) = I_i \int_{t_0}^{t_0+\tau} dt' Q_i^{dep}(t')$ --

Column 13,

Formula (14), " $\sum_{i,j} \int_0^{0+T'} dt' I_i Q_i^{dep}(t') \alpha_{ij}(t') = \sum_i \int_0^{0+T'} dt' I_i Q_i^{dep}(t')$ ," should read -- $\sum_{i,j} \int_{t_0}^{t_0+T'} dt' I_i Q_i^{dep}(t') \alpha_{ij}(t') = \sum_i \int_{t_0}^{t_0+T'} dt' I_i Q_i^{dep}(t')$ --

Formula (15), " $\sum_{i,j} \int_0^{0+T'} dt' w_{ij}^n I_i Q_i^{dep}(t') \alpha_{ij}(t')$ " should read -- $\sum_{i,j} \int_{t_0}^{t_0+T'} dt' w_{ij}^n I_i Q_i^{dep}(t') \alpha_{ij}(t')$ --

Column 14,

Formula (16), " $\sum_{i,j} \int_0^{0+T'} dt' w_{ij}^n f_{ij}^n(t')$ " should read -- $\sum_{i,j} \int_{t_0}^{t_0+T'} dt' w_{ij}^n f_{ij}^n(t')$ --

Formula (17), " $N_i(t) = \sum_d \int_{0+\tau} dt' \frac{\overline{D}}{D_d} I_i Q_{id}^{dep}(t')$ ," should read -- $N_i(t) = \sum_d \int_{t_0+\tau}^{t} dt' \frac{\overline{D}}{D_d} I_i Q_{id}^{dep}(t')$ --

Signed and Sealed this
Tenth Day of July, 2012

David J. Kappos
*Director of the United States Patent and Trademark Office*